US006976175B2

(12) United States Patent
England et al.

(10) Patent No.: US 6,976,175 B2
(45) Date of Patent: *Dec. 13, 2005

(54) HIERARCHICAL TRUSTED CODE FOR CONTENT PROTECTION IN COMPUTERS

(75) Inventors: Paul England, Bellevue, WA (US); Butler W. Lampson, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/011,457

(22) Filed: Dec. 13, 2004

(65) Prior Publication Data

US 2005/0097355 A1 May 5, 2005

Related U.S. Application Data

(63) Continuation of application No. 10/870,845, filed on Jun. 17, 2004, which is a continuation of application No. 09/287,698, filed on Apr. 6, 1999, now Pat. No. 6,775,779.

(51) Int. Cl.[7] .................... H04L 9/00; G06F 17/60
(52) U.S. Cl. .............. 713/200; 713/175; 713/176; 713/193; 705/51; 711/154
(58) Field of Search ................ 713/150, 168, 713/175, 176, 189, 193, 200–202, 194; 705/50–54, 705/77–79; 711/100, 154, 163

(56) References Cited

U.S. PATENT DOCUMENTS

| | | |
|---|---|---|
| 5,335,334 A | 8/1994 | Takahashi et al. |
| 5,491,827 A | 2/1996 | Holtey |
| 5,557,518 A | 9/1996 | Rosen |
| 5,671,280 A | 9/1997 | Rosen |
| 5,745,886 A | 4/1998 | Rosen |
| 5,841,869 A | 11/1998 | Merkling et al. |
| 5,872,847 A | 2/1999 | Boyle et al. |
| 5,892,904 A | 4/1999 | Atkinson et al. |
| 5,963,980 A | 10/1999 | Coulier et al. |
| 5,991,399 A | 11/1999 | Graunke et al. |
| 6,105,137 A | 8/2000 | Graunke et al. |
| 6,185,683 B1 | 2/2001 | Ginter et al. |
| 6,192,473 B1 | 2/2001 | Ryan, Jr. et al. |

(Continued)

FOREIGN PATENT DOCUMENTS

GB 2 260 629 A 4/1993

OTHER PUBLICATIONS

"Phoenix Technologies Partners with Secure Computing in Enterprise Security Marketplace", Jul. 12, 2001, Business Wire, courtesy of dialog text search, p. 1-2.

*Primary Examiner*—Ayaz Sheikh
*Assistant Examiner*—Christopher Revak
(74) *Attorney, Agent, or Firm*—Lee & Hayes, PLLC (57) ABSTRACT

An architecture for protecting premium content in a nonsecure computer environment executes only a small number of code modules in a secure memory. The modules are arranged in a hierarchy of trust, where a module names other modules that it is willing to trust, and those modules in turn name other modules that they are willing to trust. A secure loader loads a security manager that oversees a number of content-providing modules for manipulating the content. A memory manager assigns permissions to various pages of the secure memory. The memory has rings of different security. The security model can be extended to program modules and other devices on the computer's bus, such as DMA controllers and peripherals.

29 Claims, 4 Drawing Sheets

U.S. PATENT DOCUMENTS

| | | |
|---|---|---|
| 6,212,636 B1 | 4/2001 | Boyle et al. |
| 6,229,894 B1 | 5/2001 | Van Oorschot et al. |
| 6,327,652 B1 | 12/2001 | England et al. |
| 6,330,588 B1 | 12/2001 | Freeman |
| 6,338,139 B1 | 1/2002 | Ando et al. |
| 6,363,486 B1 | 3/2002 | Knapton, III |
| 6,367,012 B1 | 4/2002 | Atkinson et al. |
| 6,389,537 B1 | 5/2002 | Davis et al. |
| 6,477,252 B1 | 11/2002 | Faber et al. |
| 6,480,961 B2 | 11/2002 | Rajasekharan et al. |
| 6,609,199 B1 | 8/2003 | DeTreville |
| 6,651,171 B1 | 11/2003 | England et al. |
| 2002/0007452 A1 | 1/2002 | Traw et al. |
| 2002/0069365 A1 | 6/2002 | Howard et al. |
| 2002/0107803 A1 | 8/2002 | Lisanke et al. |
| 2002/0120936 A1 | 8/2002 | Del Beccaro et al. |
| 2002/0152173 A1 | 10/2002 | Rudd |
| 2004/0015694 A1 | 1/2004 | DeTreville |

HIERARCHICAL TRUSTED CODE FOR CONTENT PROTECTION IN COMPUTERS

RELATED APPLICATIONS

This application is a continuation of U.S. patent application Ser. No. 10/870,845, filed on Jun. 17, 2004, which is a continuation of U.S. patent application Ser. No. 09/287,698, filed on Apr. 6, 1999, now U.S. Pat. No. 6,775,779, each entitled "Hierarchical Trusted Code For Content Protection In Computers", each naming Butler W. Lampson and Paul England as inventors, the disclosures of which are hereby incorporated herein by reference. This application is also related to U.S. patent application Ser. No. 11/018,065, filed on Dec. 20, 2004, having common title and inventorship, which is also a continuation of U.S. patent application Ser. No. 10/870,845.

TECHNICAL FIELD

The present invention relates to electronic data processing, and more particularly concerns software and hardware for preventing the unauthorized manipulation of proprietary content in a computer.

BACKGROUND

Multimedia and other proprietary content is increasingly being made available in forms that can be received, processed, and presented in computers, or in sophisticated devices that share many of the characteristics of computers. Public networks such as the Internet can provide online selection and delivery of content in high-quality digital form. Even off-line media such as optical discs may have only specific rights granted, to a customer, such as playback for a limited time period. For customers, online delivery and sophisticated licensing increase timeliness and convenience. Publishers can realize lower delivery costs, reduced physical inventory, and other benefits. Unfortunately, these advantages are often outweighed by the ease of unauthorized access, copying, and other manipulation by the customer or by others.

Unauthorized copying of online and other digital content is becoming a significant problem. In the past, most premium content available on the World Wide web was of sufficiently low value that wholesale piracy was not attractive, and casual copying was not overly damaging to the content owner. Also, some digital media players already incorporate hardware protection against unauthorized access or manipulation. However, present and potential distributors increasingly desire to make available high-value content, and are increasingly fearful of both organized and casual theft of their rights.

New modes of distributing digital content frequently involve the transmission of a digital bit stream independently of a physically protectible medium, and manipulation by remote software and hardware over which the distributor has no control. These characteristics render the content especially susceptible to diversion by third parties, and to use by legitimate recipients of the content outside the scope of the license granted them by the distributors. Digital rights management is fast becoming an important concern as online commerce continues its rapid growth. Content distributors and the electronics industry must quickly develop technologies and protocols for ensuring that licensed digital content is guaranteed to be handled in accordance with the rights granted by its distributors. If adequate protection is not forthcoming, those who distribute premium content may be put out of business by widespread theft or, more likely, will refuse to deliver content in the otherwise desirable new ways that technology makes available. Digital data that is furnished to a user with restrictions upon its use will be referred to as licensed or premium content.

Traditional security systems do not adequately address this difficulty. Existing techniques for encrypting and storing data, and for authorizing and revoking user privileges have little effectiveness against legitimate users of the hardware and software that ultimately employ the data—and it is precisely those legitimate users who have both an interest and an ability to misuse the data. Traditional smart cards merely provide authentication and encryption. Cryptographic coprocessors provide higher-performance services and are programmable; but operating systems and other untrusted programs can employ their functions for unauthorized purposes.

Three broad categories of solution are available for this problem. One solution is to forego general-purpose computers altogether in favor of special-purpose tamper-resistant hardware for delivery, storage, and display of valuable digital content. This is the approach adopted by the cable industry, and appears to be the model for digital video disk (DVD) players. The second solution employs proprietary data formats and software, or software containers. The third solution modifies a general-purpose computer to support a model for client-side content security and digital rights management.

One approach within the third category of solutions introduces the concept of a secure operating system. Minimal hardware support can allow a personal computer or similar general-purpose machine to authenticate to remote distributors that the computer is running a copy of an operating system that is trusted to provide adequate protection for digital content, and that even a legitimate user in physical possession of the computer cannot vitiate this protection. Copending commonly assigned provisional patent application Ser. No. 60/105,891, filed on Oct. 26, 1998, entitled "System and Method for Authenticating an Operating System to a Central Processing Unit, Providing the CPU/OS With Secure Storage, and Authenticating the CPU/OS to a Third Party", application Ser. No. 09/227,611, filed on Jan. 8, 1999, now U.S. Pat. No. 6,327,652, entitled "Loading and Identifying a Digital Rights Management Operating System", application Ser. No. 09/227,568, filed Jan. 8, 1999, entitled "Key-Based Secure Storage", and application Ser. No. 09/227,559, filed Jan. 8, 1999, entitled "Digital Rights Management Using One Or More Access Prediates, Rights Manager Certificates, And Licenses" describe aspects of this concept. Authenticating the proper booting and integrity of such a trusted operating system allows it to maintain secret keys and other data, and to prove to remote parties that it is running properly.

This solution works well. However, it requires constructing the entire operating system, as well as device drivers and other components, with the mechanisms for trusted operation. In the environment of relatively small systems, these problems need not be significant. Larger operating systems, such as the Windows2000® operating system available from Microsoft Corporation, have millions of lines of code, and thousands of individual modules, few of which have anything to do with digital rights management. Furthermore, such large operating systems are desirably open to extension and modification by third-party sellers of programs such as drivers, plug-ins, and utilities. It is difficult to ensure that all outside programmers comply with the rules required to preserve rights management, and a certification program could become onerous. Trusting entire operating systems also requires that bugs in any part of the system be remedied very quickly and thoroughly, because rights management involves the entire system.

The success of digital rights management in developing new methods of content delivery therefore still needs an architecture for protecting rights in digital content, in the environment of general-purpose, user-controlled equipment having large, multi-purpose operating systems.

SUMMARY OF THE INVENTION

A "secure pages" architecture is capable of running designated processes, libraries, or other software components at a higher level of protection, without requiring that the remainder of an operating system or similar environment be trusted. For example, rights-management operating-system modules, communications drivers, and video decoding applications programs can run in protected memory that is not accessible by other OS modules and device drivers, and by other applications outside the OS, even if those outside components actively attempt to steal content data or data such as keys for decrypting the content. The trusted modules exchange data among themselves, and are able to prove to remote parties that they are running in a protected mode. Each trusted module optionally restricts access from some or all of the other trusted modules, to create a hierarchy of trust.

Secure pages handle premium content with a system of code modules in a hierarchy of trust, where a module names other modules that it is willing to trust, and those modules in turn name other modules that they are willing to trust.

According to other aspects of the invention, trusted code modules execute in a secure memory with page permissions assigned by a secure loader and a security manger, enforced by a memory manager. Code entry points are restricted for greater protection. Security managers for particular operating systems can be received from an outside source.

Secure pages also provide increased user security for applications such as home banking, where the application must be protected from viruses or other malicious code, and where it must store secrets (for instance, bank account numbers and transactions) on disk in a way that is unconditionally inaccessible to other applications, and to viruses.

Secure pages permit a code module running in a particular module to be cryptographically authenticated over a network. The code can also store secrets encrypted on disk in a form that is inaccessible from other modules. Code that runs in a secure page is also inherently protected from viruses or other adversarial attack. While it is running, the secure-page memory manager protects the code from tampering. When the code is stored on disk, it cannot be modified without changing its identity, so that any secrets stored on disk will not be available to the modified component, and the modified program will be unable to authenticate itself as trusted over a network.

DETAILED DESCRIPTION

This description and the accompanying drawing illustrate specific examples of embodiments in which the present invention can be practiced in enough detail to allow those skilled in the art to understand and practice the invention. Other embodiments, including logical, electrical, and mechanical variations, are within the skill of the art, as are other advantages and features of the invention not explicitly described. The scope of the invention is to be defined only by the appended claims, and not by the specific embodiments described below.

The description proceeds from an illustrative environment to an organization for a secure memory area and then to mechanisms for executing trusted code that can access the memory. Finally, some representative applications of curtained operation are presented.

Environment

Figure 1:
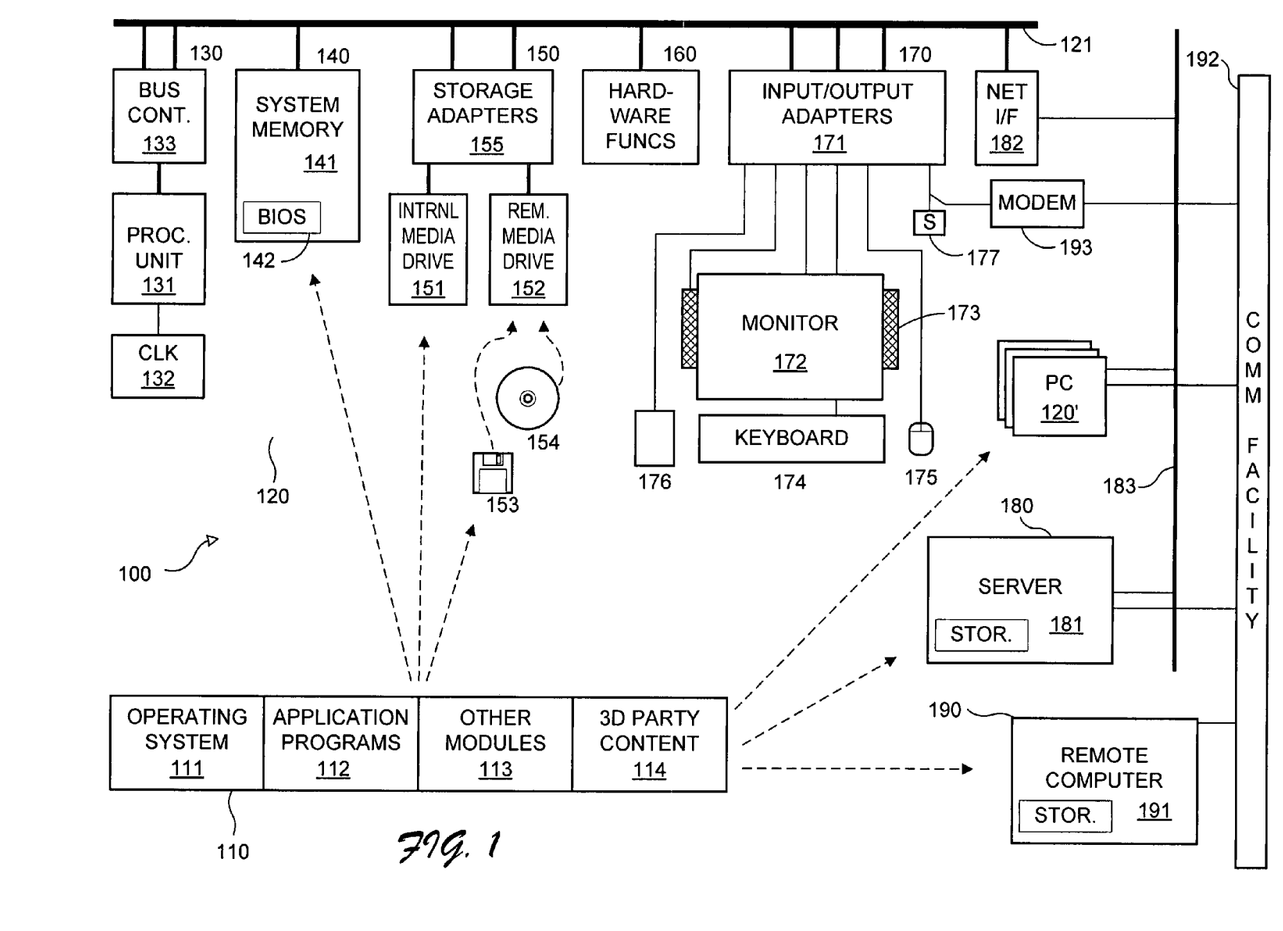
FIG. 1 is a block diagram of an illustrative environment in which the invention finds utility.

FIG. 1 is a high-level diagram of an illustrative environment 100 having software 110 and hardware 120 for hosting the invention as executable instructions, data, and/or electronic and mechanical components. Other suitable environments, and variations of the described environment are also possible.

Hardware components 120 are shown as a conventional personal computer (PC) including a number of components coupled together by one or more system buses 121 for carrying instructions, data, and control signals. These buses may assume a number of forms, such as the conventional ISA, PCI, and AGP buses. Some or all of the units coupled to a bus can act as a bus master for initiating transfers to other units. Processing unit 130 may have one or more microprocessors 131 driven by system clock 132 and coupled to one or more buses 121 by controllers 133. Internal memory system 140 supplies instructions and data to processing unit 130. High-speed RAM 141 stores any or all of the elements of software 110. ROM 142 commonly stores basic input/output system (BIOS) software for starting PC 120 and for controlling low-level operations among its components. Bulk storage subsystem 150 stores one or more elements of software 110. Hard disk drive 151 stores software 110 in a nonvolatile form. Drives 152 read and write software on removable media such as magnetic diskette 153 and optical disc 154. Other technologies for bulk storage are also known in the art. Adapters 155 couple the storage devices to system buses 121, and sometimes to each other directly. Other hardware units and adapters, indicated generally at 160, may perform specialized functions such as data encryption, signal processing, and the like, under the control of the processor or another unit on the buses.

Input/output (I/O) subsystem 170 has a number of specialized adapters 171 for connecting PC 120 to external devices for interfacing with a user. A monitor 172 creates a visual display of graphic data in any of several known forms. Speakers 173 output audio data that may arrive at an adapter 171 as digital wave samples, musical-instrument digital interface (MIDI) streams, or other formats. Keyboard 174 accepts keystrokes from the user. A mouse or other pointing device 175 indicates where a user action is to occur. Block 176 represents other input and/or output devices, such as a small camera or microphone for converting video and audio input signals into digital data. Other input and output devices, such as printers and scanners commonly connect to standardized ports 177. These ports include parallel, serial, SCSI, USB, FireWire, and other conventional forms.

Personal computers frequently connect to other computers in networks. For example, a local area network (LAN) acting via server 180 may connect PC 120 to other PCs 120' and/or to remote servers 181 through a network adapter 182 in PC 120, using a standard protocol such as Ethernet or token-ring. Although FIG. 1 shows a physical cable 183 for interconnecting the LAN, wireless, optical, and other technologies are also available. Other networks, such as wide-area network (WAN) 190 can also interconnect PCs 120 and 120', and even servers 181, to remote computers 191. FIG. 1 illustrates a communications facility 192 such as a public switched telephone network for a WAN 190 such as an intranet or the internet. PC 120 can employ an internal or external modem 193 coupled to serial port 177. Other technologies such as packet-switching ISDN, ATM, DSL, frame-relay are also available. In a networked or distributed-computing environment, some of the software 110 may be stored on the other peer PCs 120', or on computers 181 and 191, each of which has its own storage devices and media.

Software elements 110 may be divided into a number of types whose designations overlap to some degree. For example, the previously mentioned BIOS sometimes includes high-level routines or programs which might also be classified as part of an operating system (OS) in other settings. The major purpose of OS 111 is to provide a software environment for executing application programs 112 and for managing the resources of system 100. An OS such as Microsoft® Windows® operating system or Windows NT® operating system commonly implements high-level application-program interfaces (APIs), file systems, communications protocols, input/output data conversions, and other functions.

Application programs 112 perform more direct functions for the user. A user normally calls them explicitly, although they can execute implicitly in connection with other applications or by association with particular data files or types. Modules 113 are packages of executable instructions and data which may perform functions for OSs 111 or for applications 112. Dynamic link libraries (.dll) and class definitions, for instance, supply functions to one or more programs. Content 114 includes digital data such as movies, music, and other media presentations that third parties make available on media or by download for use in computer 120. This material is frequently licensed for a charge, and has certain restrictions placed upon its use.

Secure Pages

A secure pages architecture employs a memory, or an area of memory, that can be restricted from access by nontrusted code. It also requires a facility for executing code for certain program modules in a trusted manner that resists attack from outside sources, including a legitimate user of the hardware and software of system 120, FIG. 1. The present invention can use any of a number of techniques known in the art for implementing such secure memory and trusted code execution. The embodiments detailed herein are aimed at reducing hardware and software modifications from present-day or "legacy" personal computer designs. For example, existing processor modes and/or a special chipset around an existing processor provide a measure of hardware protection. Curtained code, as set forth in copending commonly assigned application Ser. No. 09/287,393, filed on Apr. 6, 1999, now U.S. Pat. No. 6,651,171, is an example of a way to execute code in a trusted manner without extensive changes to existing system designs.

Figure 2:
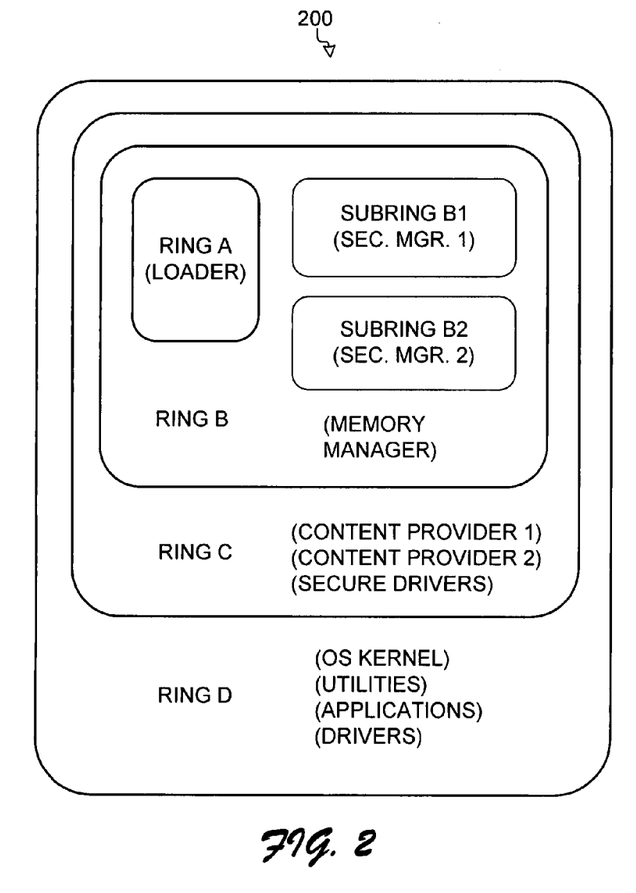
FIG. 2 is a block diagram of a form of memory-protection hardware for use with the invention.

As in application Ser. No. 09/287,393, all system memory is conceptually divided into a number of regions or rings 200, FIG. 2, for security purposes. Ring A is the most restricted. Only program code executing within ring A can read data from or write data to memory addresses designated as the Ring-A region. Ring-A code can access memory in all other rings without restriction. Ring B is a region of memory addresses for storing code and data that can be accessed only by code executing within Ring B or Ring A. Ring-B code can also initiate the execution of code in Ring A under certain conditions that guarantee the integrity of the Ring-A code. Ring B can, if desired, be divided into a number of subrings B1, B2, etc. that cannot access memory in any of the other subrings but otherwise exist on the same level with respect to other rings. Ring-C memory can be accessed freely by code in Rings A and B, but can itself only access these more secure rings for controlled code execution. Ring D has no security. Ordinary application programs and non-trusted parts of the operating system run in Ring C. Code in any of the secure rings A, B, and C can access Ring-D memory addresses for any purpose: read, write, and initiate code execution. Additional rings can provide further levels of security if required. Rings operate independently of hardware or software modes such as privileged, kernel, and user modes.

Figure 3:
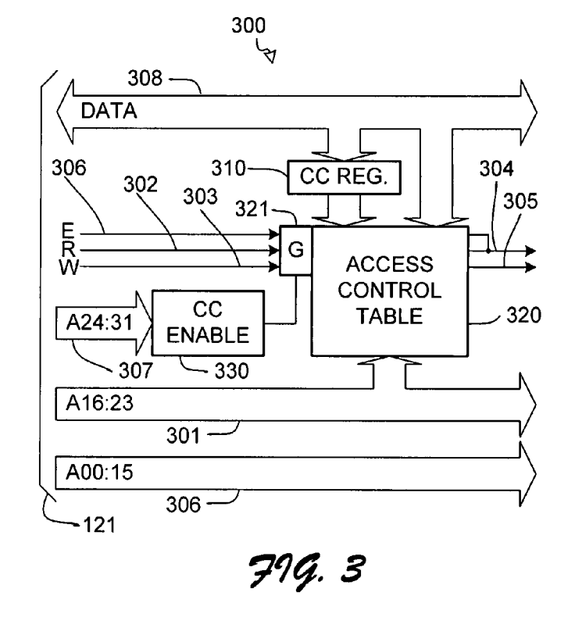
FIG. 3 symbolizes a memory organization for implementing secure pages.

FIG. 3 details an example of hardware 300 added to PC 120, FIG. 1, for defining restricted-access storage as a set of secure memory pages or regions within the same address space as that of system memory 141. Hardware 300 can be incorporated into a system controller chip 133, or directly into processor 131 itself.

An 8-bit curtained-code (CC) register 310 holds a designation of one of a number of security managers running in Ring B, and a designation of one of a number of content-provider software modules running in Ring C. In general, CCR=n,m signifies content provider m running in Ring C under the control of security manager n in Ring B. CCR=n,0 means that security manager n itself is executing. CCR=0,0 indicates that a program is running in Ring A, and CCR=FF indicates code running in the unprotected Ring D. The contents of the CCR thus indicate which program is currently running and in what ring or security level. A system having multiple processors has a separate CCR for each one.

Access-control table (ACT) 320 is a fast read/write memory containing, for example, 64K entries each associated with a page of memory at a certain page in system memory 141, specified by bits A16:23 of address bus segment 301, and with a certain combination of Ring-B and Ring-C programs specified by CCR 310. Each ACT entry contains bits that determine the rights for a program combination that accesses that page. Typically, one bit of each entry indicates whether the programs specified by the CCR contents has read privileges for the page specified. Another bit indicates write privileges for the page. A third bit can indicate execution privileges, that is, whether the programs are permitted to jump to or call a program within the page.

The ACT entry contents cause gate 321 to pass or to block processor read and write control lines 302 and 303 to memory read and write lines 304 and 305. In addition, a signal on line 306 indicates that the processor is about to execute program code within the page. (Although most present-day microprocessors do not emit such a signal directly, it can be generated easily, and in some cases can be derived from present and recent bus activity.) The third ACT bit controls memory read line 304 to allow or to block reading the addressed byte into the processor for execution. The address layout shown in FIG. 3 envisions a secure memory region having a total of 256 pages addressed by bus segment 301. Each page has 64K bytes, addressed by bits A00:15 of low-order bus segment 306. High-order address bus segment 307 places these pages at a certain point within the overall address space of system memory 141 by enabling block 330 only for a certain combination of address bits A24:31. Block 330 allows gate 321 to pass signals 302 and 303 directly to memory lines 304 and 305 except for addresses within the secure memory region.

Connections from system data bus 308 permit the contents of register 310 and access-control table 320 to be modified in a secure mode when a particular port number is addressed by processor 131. Programming these components will be described later.

Other examples of hardware and software facilities that can be added to a conventional computer system for enhancing secure operation, such as additional processor modes, curtained code, and trapping bus-master requests, can be found in the aforementioned applications Ser. Nos. 60/105,891, 09/227,611, 09/227,568 and 09/227,559.

Application Ser. No. 09/287,393, in particular, describes a technique that can be used in the present context to execute "curtained code" in a manner that defeats attempts to subvert it, to hijack its execution, or to access memory designated to it. PC 120 calls code in a secure page using a special trap facility that can be located in a processor or bus-control chipset, or in memory-manager logic for legacy systems. In this implementation, only a single entry point serves all code executing in any secure page. A calling program identifies the particular routine to be executed as a parameter in a special call instruction.

In addition, a "security porch" permits execution security for older processors. A memory controller watches instruction fetches after a secure-page routine is called to ensure that the next sixteen or so fetches are executed in ascending order by the initiating processor. If this is the case, then this porch code can be designed so that its keys and self-security instructions are mapped into memory in the region following the porch code for the initiating processor. If the processor has an internal cache then not all instruction fetches and executions generate bus activity. However, the act of flushing the cache normally generates a recognizable bus transaction. Thus, entering the security porch requires the calling application or operating system to issue an instruction to flush the processor's internal caches, and then to jump to the security porch. Correct entry into the security porch requires that the bus agent see a "cache invalidate" transaction, followed by the proper sequential instruction fetches.

For example, porch code can set the interrupt vector to a secure handler in secure memory and switch off caching for certain regions, or invalidate the cache. Once this is accomplished, the curtained code can execute without fear of preemption by untrusted code. Enforcing an entry point and protecting the first few dozen instructions allows the curtained memory to be visible to other calls without compromise. An alternative implementation could use a trap into memory protected by a processor system mode, in which the processor is protected against interruption; the system-mode handler can then turn off interrupts and jump into the protected code rather than returning to the interrupting program.

A secure bus agent, such as the memory manager described below, watches the bus and keeps (or derives) a security state for all parties using the bus. This permits multiprocessor systems to be handled securely. Moreover, other bus agents such as bus-mastering IO controllers can be selectively denied or granted rights to curtained memory.

Figure 4:
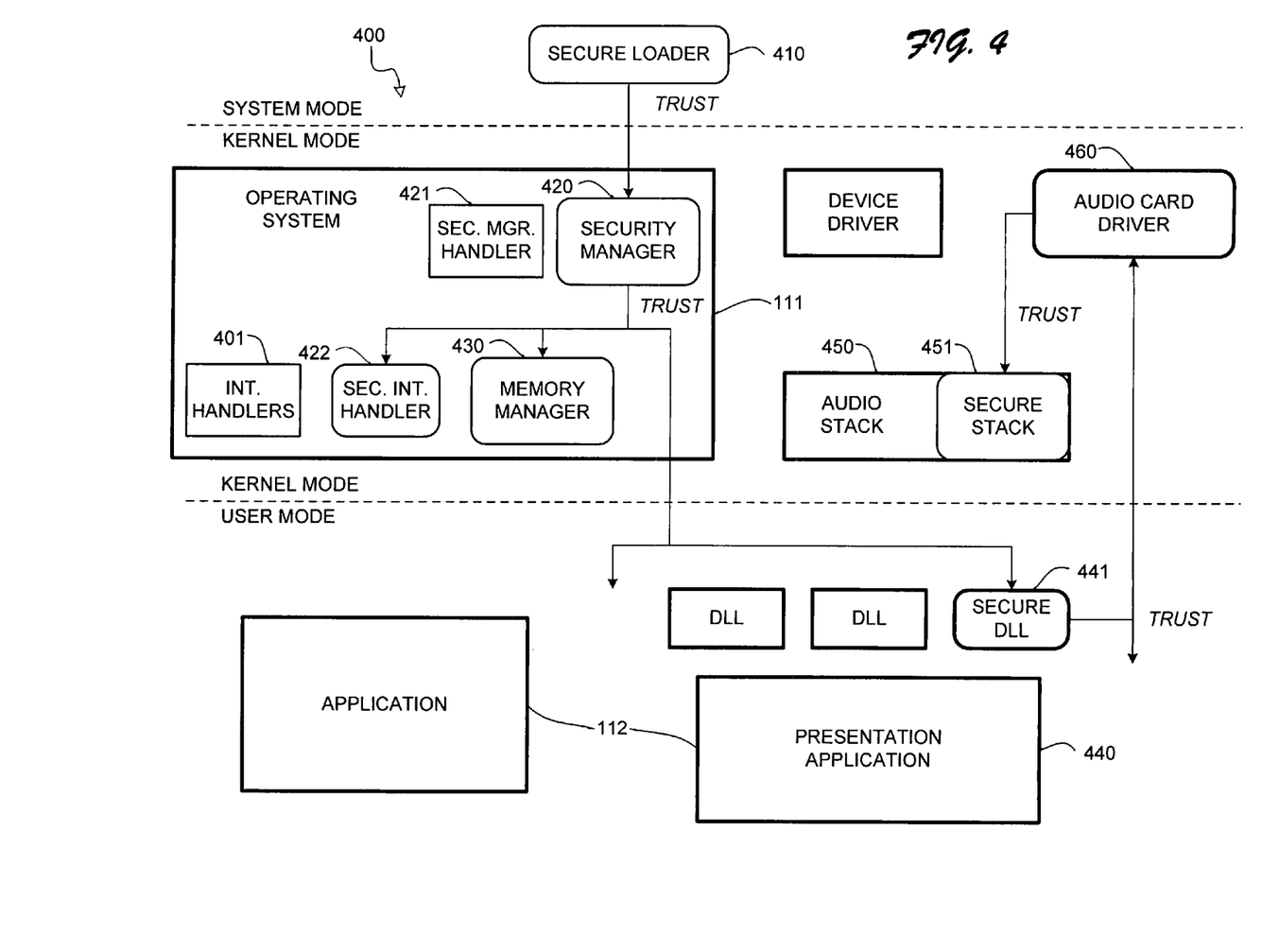
FIG. 4 shows an example system employing a secure pages organization according to the invention.

FIG. 4 diagrams components 400 employed in the secure pages approach in an illustrative embodiment involving the playback of audio data such as a song. Adaptations for other forms of data are within the art. Software modules running in and storing data in secure memory pages are shown as blocks with rounded corners. Arrows labeled "trust" symbolize the granting of trust from a module to one or more other modules. Dashed horizontal lines indicate processor operating modes.

The root of trust of secure code modules is a secure loader 410, running in Ring A of the secure memory region, under a secure system mode of the processor. Trust descends hierarchically to one or more security managers 420 executing in Ring B, or in one of its subrings, in kernel mode, the same mode as the rest of OS 111. With the paragraph shown in FIG. 4, most of the remainder of OS 111 need not have any additional protection. Security manager 420 in turn confers trust upon a memory manager 430 responsible for a group of pages of the secure memory; memory manager 430 also runs in Ring B. Security manager 420 also confers trust at a lower level upon certain designated content providers. A content provider typically involves an application program (112, FIG. 1) such as application 440 for storing premium content and/or presenting it to a client or user of the system. Again, it has been found that most of the application code need not have any increased protection. In this example, only one dynamic link library (DLL) 441 used by application 440 requires trust in order to protect the content. In fact, because DLLs are frequently shared among multiple programs, it is likely that a single secure DLL can provide protection for other applications as well. Module 441 runs in the processor's user mode, in Ring C of the secure memory. The remaining applications, as well as all other non-secure modules in FIG. 4, run in the outermost memory Ring D.

The secure content-provider module 441, receiving trust from security manager 420, in turn entrusts a further, lower level of trust in other modules. In this case, the audio application confers trust upon a named audio-card driver module 450, which in turn names a secure portion 461 of the computer's audio processing stack 460 as worthy of trust for processing the premium audio content. This tree of hierarchical trust can be extended further if desired. Each secure module can contain names of one or more other specific modules it is willing to trust, and can confer trust upon them when it receives trust from higher in the tree. For example, a first module trusted by a content distributor for handling the digital content may designate another module specified by the first module as trusted for handling the digital content, where the other module is a hardware device, the first module verifies the identity of the hardware device and the first module grants access to a designated memory area to the hardware device. Trust can be established declaratively or programmatically, by naming the public key, digest, or other signature of other applications or modules that have access to some or all of their code or data in the secure storage. In this example, application 440 (actually its secure DLL 441) states that it trusts code signed by the key of driver 460, and the secure audio stack trusts the driver named by digest, e.g., '0X1254BE'. Security manager 420, via its privileged interaction with memory manager 430, interprets and establishes these hierarchical trust relationships. Manager 430 also acts as a secure bus agent.

To this point, however, there is still no protection against the owner or user of the system. Anyone can write an application that chooses not to use the secure path to device driver 460. Any content played can be easily picked off by pirate code in the audio stack. Therefore, security manager 420 provides two additional facilities. First, it offers a way for the system to vouch cryptographically for the digest or signature of code running in a secure page. Second, SM 420 establishes a way for code in a secure page to store secrets on persistent storage, such as a hard disk, that can not be accessed by any other module, application or process.

Next, content protection is divided into two stages. When system 120 is online to a content distributor such as remote computer 191, FIG. 1, SM 420 signs a statement that a particular application component such as DLL 441 is running in a secure page. The distributor thus knows precisely the application or module that will handle the sensitive data, and can choose to trust it or not. As long as neither the SM nor the hardware security has been compromised, the content distributor knows all the information necessary to establish trust, namely, that other components in the operating system cannot see the rights-protected data. However, current application and OS architectures require multiple modules to work cooperatively in processing and rendering content. For example, an application program might decrypt audio, hand it to an OS component to be decompressed, which then hands the decompressed audio to a further component to send the audio data to the output device. The invention supports this architecture by allowing a module to name other modules that can have direct access to its memory space. The naming must be cryptographic. For instance, the audio player might trust an OS component having a digest='ox1234', or it might trust all components correctly signed with the public key of a particular manufacturer. Clearly, modifying a component to allow it to trust any other component cannot be allowed, because an attacker could simply write an OS component that steals data to the list of trusted modules. To prevent such attacks, the actual identity of the application includes both the digest of the code itself and the name of any additional trusted modules. Modifying a component to trust another new component thus changes its identity, making it unable to unseal secrets stored on disk and unable to authenticate itself over the network to content providers.

Typically, a content distributor names other components that it trusts to work cooperatively on the premium data. However, this information is implicit in the signed component. Again, if an application says it trusts another component, then this statement of trust must become part of its identity. The distributor therefore need only trust certain applications to receive the keys to encrypt premium content, and the SM and security hardware will ensure that the application is not subverted, and that its secrets are not read or changed by untrusted code. This capability is similar to the QUOTE facility of the authenticated-boot system discussed in application Ser. No. 60/105,891.

When system 120 is offline, SM 420 provides secure storage to each trusted application, identified by its digest or public key, for keys and other secret data received from the distributor. The trusted application can now store a song decryption key using this storage facility, and only the same application will be able to access it. For example, application 440 can store a song to disk 151, and no untrusted application will be able to decode the song. This capability offers continued rights management when system 120 is offline, and it survives a reboot. For a purely software implementation of security manager 420, it is possible that public key versions of the SEAL and UNSEAL operations described in application Ser. No. 60/105,891 could be used in addition or as a replacement for the QUOTE facility.

Code running in the secure memory pages cooperates with the code in other, untrusted modules of the main operating system 111. As described above, any module can call into a secure page using the special trap facility. The secure-page code can exit normally back to an untrusted module, relinquishing its protected status as it does so; or, a timer event or other interrupt can occur upon exit. In order to reduce changes to the remainder of the OS, its normal interrupt handler 401 is permitted to field interrupts, even though it is not trusted. Therefore, security manager sets up a new trusted interrupt handler 422. This handler saves the system state in a secure page, so that no other code can access it or any secrets it might contain. Handler 422 can then initiate a software interrupt that the untrusted part of the OS is allowed to process. Normal OS mechanisms reschedule security manager 420, which in turn reschedules the secure module.

The security manager is responsible for setting up an address space in protected memory appropriate for a secure module that is about to run. For instance, when the OS context switches into a trusted kernel component, a content provider's own secure pages, all the rest of kernel memory, and any other modules that have explicitly granted trust on this OS module will be mapped into active memory. It should be noted here that the mode of processor 131 is tied directly to the code that is executing. For instance, there is no 'enter user mode' instruction; the processor merely traps to the code entry points in a secure page. During this transition, the mode changes automatically. This allows placing secret keys and code in a module from which only the trusted code can ever access the secret keys, providing a broad general-purpose model of platform security.

Security manager 420 is the only piece of code that is allowed to set or change page permissions in secure memory. The SM establishes a memory map by telling the programmable memory manager to map or hide various pages in the system-memory address space by writing to a port or a memory address that programs memory manager 430.

When an OS module calls the SM indicating a CP (content provider) 440 that should execute, the SM maps the CPs pages, along with any other secure pages that the CP has access to, into the processor's address space, then starts executing the CP. Should an interrupt occur, the trusted code saves the current machine state in a safe place. The security manager allows OS 111 to handle the interrupt. The normal interrupt handler 401 reschedules the SM, which later restarts the interrupted CP with the safely saved state. Additionally, code in a secure page might have to call functions provided by an untrusted module of the operating system. It can manage this by requesting security manager 420 to save its state in a safe location before calling the normal OS module, then restoring the state and marshalling parameters back into the secure page when the OS module returns. Code in a secure page can have access to all other virtual memory. For instance, a kernel secure-page component will have access to all of kernel memory in addition to its own memory and some other selected secure pages. Further, a user-level secure-page component has the application's memory mapped into its virtual memory, and runs in user mode. As an alternative, the security manager can restrict the component to have access to a restricted set of memory and peripheral devices, using the normal processor protection mechanisms along with the additional protection provided by secure pages. In this way, secure pages allow an OS to run a potentially untrusted application in a "security sandbox" so that it is unable to subvert or damage the rest of the system.

Security-manager handler 421 runs as a normal OS module with kernel privileges but no special security or trust. It carries out several broad sets of functions. It provides cryptographic services to modules running under it. It offers an interface to the OS for loading and unloading curtained code for secure modules. It furnishes argument marshalling and context switching into and out of the main OS and the trusted components. It supplies the normal-code entry point to SM functions. Handler 421 is called on an OS thread and handles the context switch into the secure code comprising the SM. Should the SM—or a module running under the control of a particular SM—be preempted, the SM handler saves the state, trampolines the interrupt to the OS interrupt handler 401. After the interrupt is handled, the OS reschedules the handler, whereupon it restores the previous state and continues execution.

Another function of security manager 420 is to offer several types of cryptographic services to the CP modules. First, as mentioned, it offers a way for a CP to name other CPs that it trusts to access its data. As a practical matter, this can be accomplished by placing binary resources in a CP secure DLL such as 441 that name the digest or public key of other trusted modules. Upon initial load—or later—the SM identifies the trusted modules, so that a call to them maps their pages. The second facility allows an external data distributor to establish cryptographically which CP it is communicating with. There are several ways of doing this. A convenient way is to allow the content distributor to encrypt a data block that contains its keys or other secret data, and that names the digest or signer of the target secure content-provider module. The CP alone is able to decrypt the secrets, and only gives the secrets to the named CP or to a CP that meets the requirements of trust. A further facility is a local facility in system 120 for storing secret data such that only it or another trusted component can access it. A convenient way of doing this is to allow the CP to store a secret and the digest of a target CP encrypted with a key provided by SM 420. The SM then ensure that only the named CP ever gets to access the secret. Finally, the SM can provide services to the secure components for conferring trust or lack of trust on other bus agents to support secure DMA, bus mastering and memory mapped devices.

Because a security manager is relatively complex and is specific to a particular operating system, it is typically ill suited to being hard-coded in the processor or motherboard of a system by the manufacturer. On the other hand, providing sufficient security usually requires some form of protection at a system level. This embodiment employs a small, generic code module fixed in ROM at the manufacturer level to provide a small number of generic functions adaptable for use with many different security managers. Secure loader 410 loads an OS-specific security manager 420 into a secure page and vouches for it cryptographically, using the loader's own keys or secrets in a secure online session. Initially, the Secure Loader might even receive some code and secrets online from a system manufacturer, OS vendor, or internet service vendor. After this one online interaction, the security manager can be stored in encrypted form on disk, and its decryption and verification managed by the secure loader when the system is booted. If the Security Manager does not contain secrets—e.g., if it relies upon certificates minted by the secure loader—it could even be shipped in cleartext on a CD-ROM. The SM is practically invulnerable to tampering, because tampering with it changes its identity, as described above.

Secure loader 410 typically conducts an authenticated encrypted online session with an OS vendor to establish that the vendor can ensure that the code and keys are being issued to a trusted module. Encryption is needed if there is an embedded secret key, to ensure that untrusted parties, including the owners and legitimate users of the system, cannot modify the code or steal embedded secrets. The OS vendor transmits appropriate SM code and unique keys and a certificate that can be used in subsequent boots. If SM 420 contains a key and a certificate, they can be used directly when communicating with content distributors. If the SM does not contain cryptographic material, then authenticating components is a two-step process. Secure loader 410 must be called upon to generate cryptographic statements naming both the SM and the components that it manages. The secure loader stores the SM to designated secure pages, and also stores it to disk or other permanent storage in encrypted form so that it can be used next time without an online step.

At the lower end of the trust hierarchy, secure CP modules are able to declare secret areas, and are able to pass data securely to other secure modules, but are fundamentally responsible for their own security. For example, they must check parameters on all data passed in from outside—which may be from an adversarial caller—and are responsible for defeating timing attacks. It is not necessary, however, that modules at this level be absolutely bulletproof. The secure loader and the security manager at the upper levels of the trust hierarchy serve many different kinds of content providers, and thus must be at least as secure as any of them need to be. On the other hand, different content distributors can decide whether or not to trust content providers individually. A particular content-provider module might, for instance be made less secure in order to run faster or to use less storage. A distributor of first-run movies might decide not to trust this module, while a music group seeking to build a name for themselves might well decide to trust the same module.

When security manager 420 receives a request to execute a particular content provider, such as application 440 and/or DLL 441, it restricts the pages of secure memory that can be mapped. In this implementation, security manager 420 informs memory manager 430 which mode it is about to enter. The memory manger then adjusts access-control table 320, FIG. 3, to contain the proper per-page access permissions, i.e., the values of the read, write, and execute bits for each page of secure memory. Again, the memory manager can only restrict the permissions initially programmed into the table 320, FIG. 3, by security manager 420, and cannot expand them. When a content-provider module completes execution, it maps its pages out of memory, or requests the security manager to do so. It then relinquishes control.

As mentioned earlier, memory manager 430 must be programmed with the various privileges for each page of secure memory at the different levels specified by different possible contents of register 310, FIG. 3. It is convenient here to make programming the access-control table possible only when secure loader 410 is executing, that is, when CCR=0,0 indicates that execution is taking place in Ring A. Programming can be accomplished by writing to a dedicated port or mapping it into memory and issuing ordinary reads and writes. The secure loader has its own rudimentary software memory manager that allocates unused pages to the Ring B security managers 420 on demand. These specify the protections to be applied to the pages they own, and the Ring A code programs the hardware table 320 accordingly. Of course, loader 410 must not be subject to spoofing attacks; therefore, the security managers 420 pass parameters in their own secure memory, so that another attacking SM, or the OS, cannot change the request.

Secure memory pages afford complete software protection to premium data and other secrets as they are being processed. However, the data must also usually be rendered to an I/O device such as a frame buffer or sound adapter card 171, FIG. 1. Additional security for this step prevents data rendered by the secure device driver or other module from being read back into unsecure memory by an untrusted module. This is effectuated by making the secure memory manager 430 a bus agent able to watch all bus requests and to act on unauthorized actions.

In the case of memory-mapped I/O devices such as frame buffers, the secure device driver, running in a secure memory space, tells memory manager 430 the memory range that is being used to render the audio, and any additional protection that it desires. The additional protection might be, for example, that this region of memory cannot be read by untrusted software. If untrusted software attempts to read from this region, the memory manager sets a flag that indicates that unauthorized access has occurred. The next time the secure device driver runs—to render the next data frame, for instance—it can check for tampering, and stop playing. The secure bus agent can alternatively take more extreme actions, such as faulting the bus and stopping the processor, if desired.

The same concepts serve for devices that use ports for I/O. The secure driver 460 can indicate ports used to the bus-agent memory manager 430, which watches for unauthorized attempts to read back data or to reprogram the device.

Modern sound cards typically use bus-mastering controllers that fetch decompressed audio directly from system memory 140 as it is required. To support this sort of peripheral in a secure manner, the device driver 460 grants read (or read/write) access to a specific hardware device. This is easily accomplished with buses in conventional personal computers. Each separate device is typically inserted into a separate slot in a PCI or other expansion bus 121, FIG. 1. A secure module is able to confer trust upon a device plugged into a particular slot. All bus-master requests are accompanied by an identity of the peripheral initiating the request. Therefore, a secure module can verify this identity and grant read access for a specific region of memory to a particular hardware peripheral device. If an untrusted application, or an untrusted device (disk controller 155, for instance) attempts to read this data, the read is denied, or evidence of an attack is stored in the manner described.

Another supported high-performance IO technique is direct memory access (DMA). DMA is similar bus-master I/O, except that a DMA controller in controller group 133 is a shared resource. As such, a trusted module programming it to transfer data only to the sound card still allows it to be reprogrammed to transfer the data to a non-secure location such as another area of main memory or a disk controller. This attack is interdicted by modifying the DMA controller so that once programmed, it is locked against further programming until explicitly relinquished by a secure module. The port-locking techniques described earlier can implement this facility as well.

Figure 5:
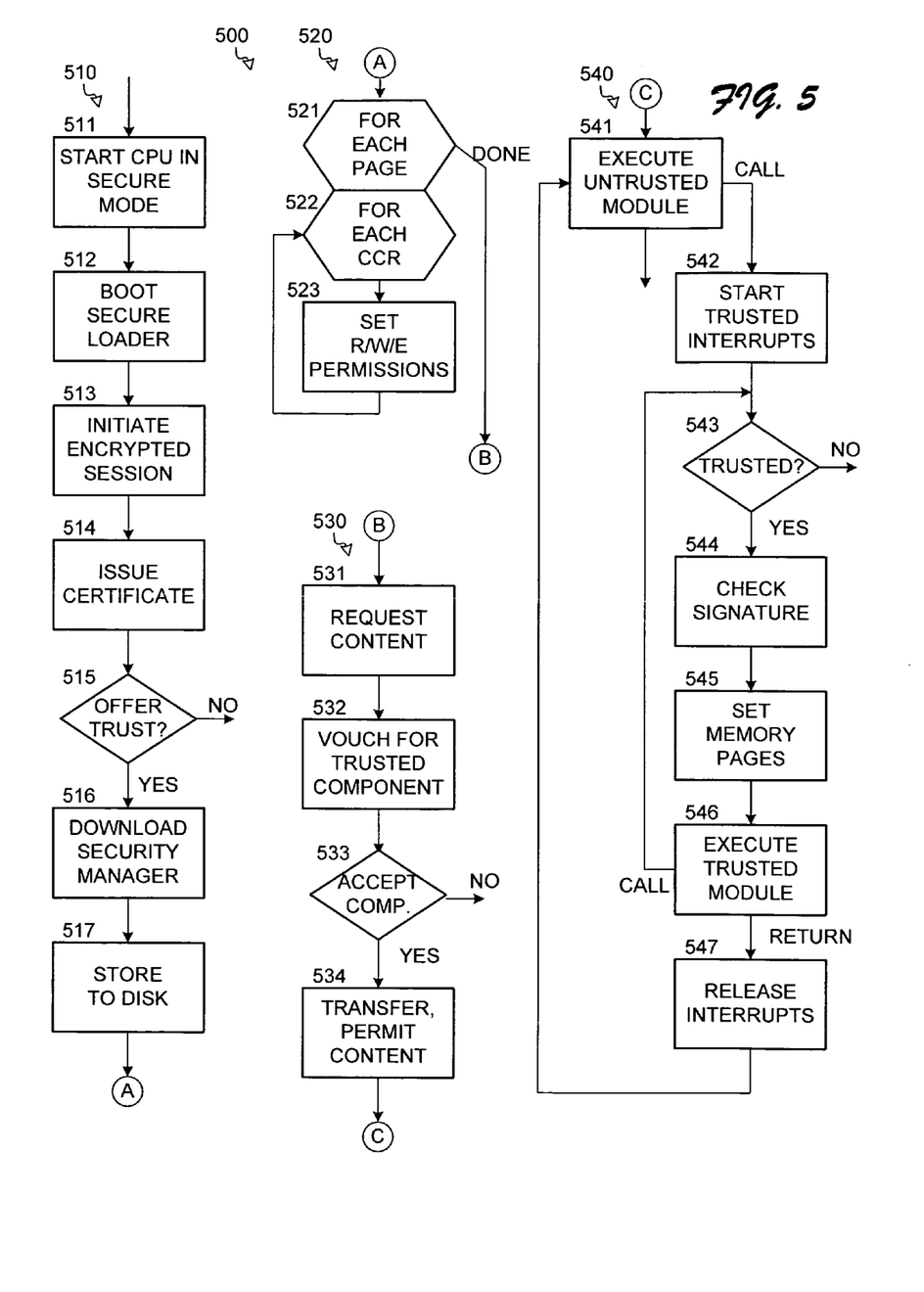
FIG. 5 is a flowchart of a method for implementing a secure pages architecture.

FIG. 5 is a flowchart 500 summarizing certain operations involving the components of the invention. Description of the steps of method 500 in a particular order does not necessarily imply any specific temporal sequence.

When system 120 starts, blocks 510 activate secure loader 410. Block 511 resets the processor in a high-security system mode. Block 512 boots the loader into Ring A of secure memory in this mode. Block 513 initiates a an encrypted connection to the OS vendor. Block 514 mints an authentication such as a signed certificate and issues it to the vendor. If the vendor decides to trust the system at block 515, it downloads an encrypted security manager module 420 and keys in block 516, and stores it to disk, block 517. (The vendor or others can download other code as well, if desired.) Encryption assures that untrusted persons, including the owner of PC 120, cannot modify the code or steal secret keys or other downloaded data. If it does not itself contain any secret data, and relies on verifications supplied by loader 410, then manager 420 can be stored in a non-encrypted cleartext form. Storing the code and data in a nonvolatile storage obviates the need for downloading the same code and keys again when system 120 is rebooted. Alternatively, the security manager can be supplied with the OS on a CD-ROM or other medium so that it does not need to be downloaded. FIG. 5 shows only a single security manager. Different OSs, or even the same OS, can have multiple security managers.

In blocks 520, secure loader 410 programs memory manager 430. Each page of memory, block 521, has a set of permissions for different CC-register contents, block 522. Again, CC register 310 defines which secure-memory ring and subring is active. Block 523 defines the read, write, and execute permissions for each entry of access-control table 320. Modules farther down in the trust hierarchy can restrict these privileges, but cannot expand them.

Blocks 530 initiate the downloading, playing, or other processing of premium content from a distributor. In block 531, an application such as 440, FIG. 4, requests that the content be downloaded or otherwise made available to system 120. In block 532, the security manager uses its secret key to make a cryptographic statement, such as a signed statement containing a one-time challenge and the digest of the module that is to receive the data. This statement, together with the certificate of the issuer of SM 420 is sufficient to assure the content provider that the module that will receive the data is trustworthy, block 533. If the SM does not itself have a key, then loader 410 mints a cryptographic statement naming the SM and the trusted component. In this case, a certificate from the manufacturer is also necessary to complete the chain of trust. Block 534 opens the content for processing, by download, passing decryption keys, and so on in a conventional manner.

Blocks 540 show the operation of hierarchical trust during operation of system 120 after the security manager is in place. A normal, untrusted module such as 440, FIG. 4 executes in block 541. If that module calls a trusted module, block 542 starts trusted interrupt handler 422, whose operation has been described above. If the security manager names the called module as trusted, block 543 causes block 544 to verify that its signature is correct—i.e., that it is the module it claims to be. Block 545 sets the secure-page permissions for that trusted module in the access-control table. Block 546 then executes the module. This module can in turn call another trusted module, which performs blocks 543–546 for the called module, using the names and signatures in the calling module to determine trust in this next level, and so on for any number of levels of a trust hierarchy. (Module 546 can also call an untrusted module, in which case it saves its state and hides any secret data, not shown, before the untrusted module begins execution.) When the trusted module completes, it returns to the execution of untrusted module 541, after releasing interrupt handler 422 in block 547. Although shown as calls and returns, transfer of control can be effected by other conventional methods, such as jumps and traps.

CONCLUSION

The present invention provides trusted handling of premium digital content without requiring that an entire operating system be made secure against attack. It offers the flexibility to use different trusted modules for different operating systems, different systems, and different content providers. It requires little in the way of hardware support, and the facilities provided at the system level are generic and widely applicable. Although a few variations have been mentioned in connection with the description of the above embodiments, others within the scope of the claim will suggest themselves to those skilled in the art.

What is claimed is:

1. A system for handling digital content in a secure manner, comprising:
    first handling means, comprising a first module trusted by a content distributor for handling the digital content;
    second handling means, comprising at least one other module specified by the first module as trusted for handling the digital content;
    third handling means, comprising at least one additional module specified by the at least one other module as trusted for handling the digital content, where the second handling means includes a security manager, and where the application program includes a component specified as trusted for handling the digital content;
    a secure memory divided into multiple pages for holding code and secret data for executing the modules and a table for storing a number of permissions for the modules for each of the pages.

2. The system of claim 1 where the second handling means is a content provider.

3. The system of claim 1 where the second handling means is a content provider, and where the content provider is an application program for presenting the digital content to a user.

4. The system of claim 1 where the second handling means is a content provider, and where the content provider is an application program for presenting the digital content to a user, the application program including a component specified as trusted for handling the digital content.

5. The system of claim 1 further comprising a plurality of other modules specified by the first handling means as trusted to handle the digital content.

6. The system of claim 1 where the second handling means is a hardware device.

7. The system of claim 1 where the second handling means is a hardware device and has an identity, and where the first handling means verifies the identity of the hardware device.

8. The system of claim 1 where the second handling means comprises a hardware device and has an identity, and where the first handling means verifies the identity of the hardware device, and further where the first handling means grants access to a designated memory area to the hardware device.

9. The system of claim 1 where the memory is divided into a plurality of rings.

10. The system of claim 1 further comprising a processor for executing the modules.

11. A system for handling digital content in a secure manner, comprising:
    secure memory means;
    secure loader means for manipulating secret data;
    security manager means named by the secure loader means as trusted for handling secret premium data comprising the digital content;
    a number of content providers named by the security manager means as trusted for performing operations upon the premium data;
    where the security manager means specifies at least one entry point for multiple code modules executing in the secure memory means.

12. The system of claim 11, where the secure loader means executes in the secure memory means.

13. The system of claim 11, where the security manager means includes means for decrypting the premium data.

14. The system of claim 11, where the secure loader means includes programming means for programming permissions for other code modules operating in the secure memory means.

15. The system of claim 11, further comprising memory manager means for holding permissions for multiple pages in the secure memory means.

16. The system of claim 11, further comprising memory manager means for holding permissions for multiple pages in the secure memory means, where the permissions for each page include a permission for executing code located in that page.

17. Computer readable code embodied in computer-readable storage media that is configured to cause one or more processors to perform acts of:
    executing a first code module;
    calling a second code module from the first module;
    setting pages in a secure memory for the use of the second module;
    executing the second module from the secure memory;
    prior to setting, determining that the second module is trusted by determining that a previously trusted code module names the second module as trusted;
    initiating a trusted interrupt handler for trapping interrupts during execution of the second module.

18. The computer readable code embodied in computer-readable storage media of claim 17, further comprising computer readable code configured to cause the one or more processors to perform acts including verifying a signature of the second module.

19. Computer readable code embodied in computer-readable storage media that is configured to cause one or more processors to perform acts of:
    starting a secure loader in the system;
    initiating a secure session with the secure loader;
    receiving a trusted security manager during the session;
    storing the security manager to a nonvolatile storage;
    thereafter, handling the premium content with the security manager;
    storing the security manager in a secure memory;
    calling a code module for handling the content via an entry point in the security manager;
    determining that the code module is named in the security manager as a trusted module;
    designating one or more pages in the secure memory for the code module;
    executing the code module from the designated pages.

20. Computer readable code embodied in computer-readable storage media that is configured to cause one or more processors to perform acts of:

starting a secure loader in the system;
initiating a secure session with the secure loader;
receiving a trusted security manager during the session;
storing the security manager to a nonvolatile storage;
thereafter, handling the premium content with the security manager;
requesting the premium content from a distributor;
determining that the security manager trusts a component for handling the premium data;
vouching for the trusted component to the distributor;
executing the trusted component upon the premium data.

21. The computer readable code embodied in computer-readable storage media of claim 20, further comprising computer readable code configured to cause the one or more processors to perform acts including causing the secure loader to issue a certificate attesting its authenticity during the secure session.

22. The computer readable code embodied in computer-readable storage media of claim 21 wherein the computer readable code configured to cause one or more processors to perform acts including receiving comprises computer readable code configured to cause one or more processors to perform acts including receiving, from another party, the trusted security manage during the secure session, where the another party to the secure session determines whether or not to trust the secure loader based upon the certificate.

23. The computer readable code embodied in computer-readable storage media of claim 21 wherein the computer readable code is further configured to cause one or more processors to perform acts including receiving the security manager in encrypted form.

24. The computer readable code embodied in computer-readable storage media of claim 23 where the computer readable code is further configured to cause the one or more processors to perform acts including causing the secure loader to decrypt the security manager.

25. The computer readable code embodied in computer-readable storage media of claim 20, further comprising computer readable code configured to cause the one or more processors to perform acts including storing the security manager in a secure memory.

26. The computer readable code embodied in computer-readable storage media of claim 20 wherein the computer readable code configured to cause one or more processors to perform acts including handling the premium content with the security manager comprises computer readable code that is configured to cause the one or more processors to perform acts including:
establishing trust for a first module;
naming within the first module at least a second module that the first module trusts;
establishing trust for the second module in response to the naming step.

27. The computer readable code embodied in computer-readable storage media of claim 20 wherein the computer readable code configured to cause one or more processors to perform acts including handling the premium content with the security manager comprises computer readable code that is configured to cause the one or more processors to perform acts including:
executing a first code module;
calling a second code module from the first module;
setting pages in a secure memory for the use of the second module;
executing the second module from the secure memory.

28. The computer readable code embodied in computer-readable storage media of claim 27, further comprising computer readable code that is configured to cause the one or more processors to perform acts including determining that the second module is a trusted module prior to setting pages.

29. The computer readable code embodied in computer-readable storage media of claim 20 wherein the computer readable code configured to cause one or more processors to perform acts including handling the premium content with the security manager comprises computer readable code that is configured to cause the one or more processors to perform acts including:
starting a secure loader in the system;
initiating a secure session with the secure loader;
receiving a trusted security manager during the session;
storing the security manager to a nonvolatile storage;
thereafter, handling the premium content with the trusted security manager.

* * * * *